Figure 1:
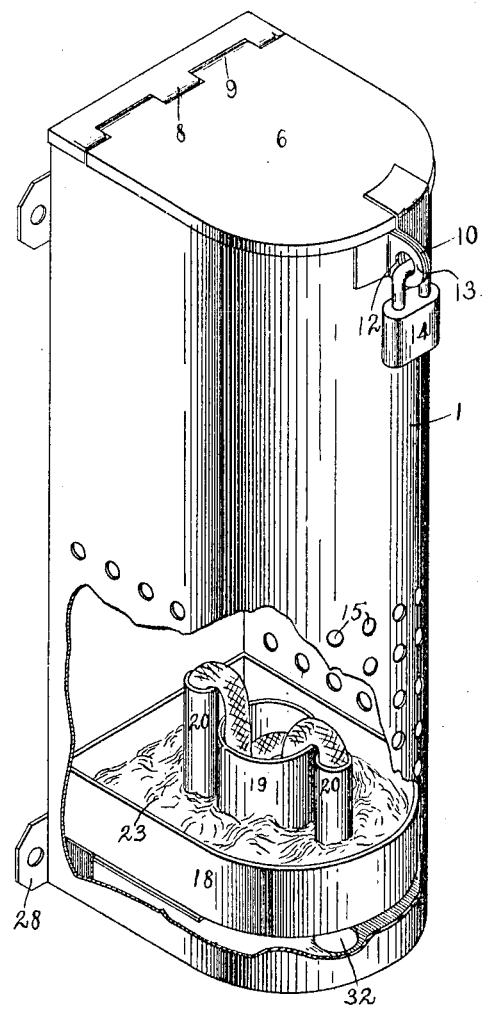

M. DREIFUSS.
DISINFECTING APPLIANCE.
APPLICATION FILED MAR. 13, 1909.

954,426.

Patented Apr. 12, 1910.

Witnesses:
Nathan F. Fretter
Curt B. Mueller

Inventor,
Max Dreifuss,
By Bates, Fouts & Hull
attys.

UNITED STATES PATENT OFFICE.

MAX DREIFUSS, OF CLEVELAND, OHIO, ASSIGNOR TO GEORGE FOX, OF CLEVELAND, OHIO.

DISINFECTING APPLIANCE.

954,426.  Specification of Letters Patent.  Patented Apr. 12, 1910.

Application filed March 13, 1909. Serial No. 483,196.

*To all whom it may concern:*

Be it known that I, MAX DREIFUSS, a citizen of the United States, residing at Cleveland, in the county of Cuyahoga and State of Ohio, have invented a certain new and useful Improvement in Disinfecting Appliances, of which the following is a full, clear, and exact description, reference being had to the accompanying drawings.

This invention relates to disinfecting appliances and more particularly to the type of such appliances that are used for local disinfecting purposes in connection with closets and the like.

Among the objects of the invention are to provide a device of this character which is extremely simple of construction and economical of production as well as one wherein the parts are accessible and which is so constructed as to supply a disinfectant at will to one or more objects.

Generally speaking, the invention may be defined as consisting of the combinations of elements embodied in the claims hereto annexed and illustrated in one exemplification in the drawings forming a part hereof, wherein—

Figure 2:
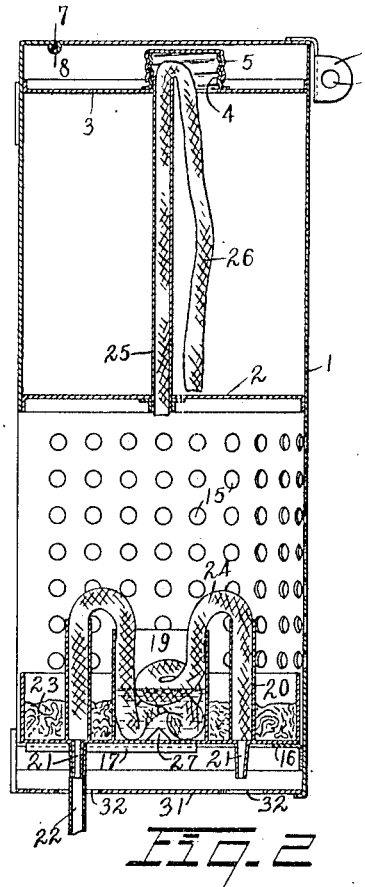

Figure 1 represents a perspective view of the appliance, part of the casing being broken away to reveal the internal construction; Fig. 2 represents a vertical sectional view through the appliance shown in Fig. 1; and Fig. 3 a perspective view showing the manner in which my appliance may be employed in connection with a plurality of objects.

Describing the parts by reference characters, 1 denotes generally the casing of my appliance, said casing comprising an upper and a lower section and being preferably semi-elliptical in cross section. The upper section is separated from the lower section by means of a partition 2 forming with the upper portion of the casing a receptacle for a deodorant or disinfectant.

3 denotes a partition which extends across the upper end of the casing and forms the top of the receptacle. Partition 3 is provided with a threaded neck 4 and said neck is provided with a screw cap 5, of ordinary construction.

6 denotes a lid at the upper end of the casing. As a convenient means for hinging the lid to the upper portion of the casing, a hinge rod 7 is carried by tubular projections 8 formed on the upper portion of the casing, near the rear end thereof. This rod extends through the tubular projections 8 and through the coöperating tubular projections 9 projecting rearwardly from the cover 6. Cover 6 is provided with a depending lug 10 having an aperture 11 therethrough adapted to register with an aperture 12 in the corresponding lug 13, said apertures being adapted to receive a bolt of a lock 14.

The lower portion of the casing 1 below the partition 2 is open at the rear and is provided with a suitable number of apertures or perforations 15. This allows the circulation of air through this part of the casing in contact with the deodorant or disinfectant which is supplied to the lower section prior to its delivery to points of use. This lower portion of the casing is provided with a shelf, which may be conveniently formed by means of projections 16 and 17 extending from the front and side walls of the casing. The shelf thus formed supports a cup 18. The front end of this cup is oval or rounded to conform to the shape of the corresponding portion of the casing. At the central portion of the cup there is provided a receptacle 19, and on each side of said receptacle there is an upwardly projecting tube 20. The lower end of each of these tubes communicates with a nipple 21 projecting downwardly from the bottom of the cup. Nipples 21 serve for the supply of deodorant or disinfectant to the points of use. If desired, either or both of these nipples may form connection with tubes such as 22 for conducting the disinfectant to the point or points of local application.

Outside the central receptacle 19 and between the same and the wall of the cup there is placed absorbent material 23, as mineral wool. Within the receptacle 19 there is coiled the central portion of a wick 24 of suitable material, the ends of the wick being shown as inserted into the tubes 20.

For the purpose of supplying the disinfectant from the receptacle in the upper end of the casing to receptacle 19, I provide a tube 25 extending from an aperture in the partition 2 upwardly into the screw connection 4. This tube is located preferably at the center of partition 2, and the screw connection 4 is sufficiently eccentric with respect to partition 3 to enable the upper end of tube 25 to enter the connection 4, at one side thereof. A wick 26 is inserted into the tube 25 with one end extending through the tube and below the partition 2. The other end of the wick is within the receptacle formed above the partition 2 and preferably extends to said partition, in order to conduct all of the deodorant from said receptacle into the receptacle 19. The arrangement of the tube 25 and neck 4 provides convenient access to the wick and tube, for the purpose of adjusting or exchanging wicks and also affords convenient means for securing the upper end of the tube in place, as by soldering the same to the neck.

The lower end of the receptacle 19 is provided with apertures 27, which allow some of the disinfectant supplied thereto to pass into the body of the cup and into the absorbent material therein. The casing 1 is provided at its rear edge with ears 28 by means of which it may be secured to any suitable object.

Figure 3:
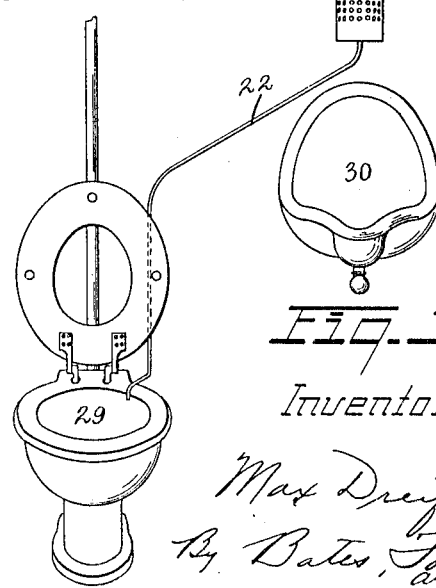

From the above description, the operation will doubtless be clear. The disinfectant is supplied from the upper receptacle to receptacle 19 by the capillary and siphonic action of the wick 26. The disinfectant thus supplied to receptacle 19 is partially absorbed by the wick 24 and supplied by capillary and siphonic action to the nipples 21. Any excess disinfectant passes through the apertures 27 and into the absorbent material 23, and the air circulating through the perforations 15 is charged with such disinfectant. In Fig. 3, there is shown an arrangement by which the disinfectant may be supplied to a closet bowl 29 and a urinal 30. It will be apparent that, by connecting another tube similar to tube 22 to the other nipple, the same appliance may be employed to disinfect two bowls. If desired to supply disinfectant to one object only, it will be only necessary to remove from one of the tubes 20 the portion of wick therein and coil the same within the receptacle 19. By employing loosely or tightly woven wicks 24 and 26, the rate of feed of the disinfectant may be regulated so that the receptacle will require refilling more or less frequently, as conditions may require.

Among the advantages of my invention are its extreme simplicity, its ease of convertibility from a single to a double supply or vice versa, its cheapness of production, and its efficiency in operation. It will be impossible for unauthorized persons to tamper with the appliance proper without actually removing the same from the wall or other support, as the cup 18 is supported above the bottom 31 of the casing and is inserted into and withdrawn from the casing through the opening at the rear. The bottom 31 is provided with apertures 32 to permit the flow of the deodorant, either by dropping therethrough or by flowing through the tubes 22 that may be connected to nipples 21.

Having thus described my invention, what I claim is:

1. In a disinfecting appliance, the combination of a casing having in the upper portion thereof a supply receptacle, said casing being perforated below said receptacle, a cup in the perforated portion of said receptacle, said cup having a receptacle therein provided with a perforation at the lower end of the wall thereof, absorbent material in said cup and surrounding the receptacle therein, a pair of nipples projecting downwardly from the bottom of said cup, a tube extending upwardly from each of said nipples, and wicking connecting said tubes and said lower receptacle.

2. In a disinfecting appliance, the combination of a casing having in the upper portion thereof a supply receptacle, a cup in the lower portion of said receptacle, said cup having a receptacle therein provided with a perforation at the lower end of the wall thereof, absorbent material in said cup and surrounding the receptacle therein, a nipple projecting downwardly from the bottom of said cup, a tube extending upwardly from said nipple, and wicking connecting said tube and said lower receptacle.

3. In a disinfecting appliance, the combination of a casing having a supply receptacle, said casing being perforated below said receptacle and having a cup at the lower portion thereof, a pair of nipples projecting downwardly from the bottom of said cup, a tube extending upwardly from each of said nipples, wicking for delivering disinfectant from said cup to either or both of said tubes, and absorbent material in said cup.

4. In a disinfecting appliance, the combination of a supply receptacle for liquid disinfectant, a cup therebeneath, said cup having a nipple projecting downwardly from the bottom thereof, a tube extending upwardly from said nipple, wicking for delivering disinfectant from said cup to said tube, and absorbent material in said cup.

In testimony whereof, I hereunto affix my signature in the presence of two witnesses.

MAX DREIFUSS.

Witnesses:
Geo. Fox,
J. B. Hull.